United States Patent [19]

Sucato

[11] Patent Number: 5,093,854
[45] Date of Patent: Mar. 3, 1992

[54] PHONE ACTUATED CALENDAR

[76] Inventor: John D. Sucato, 4616 N. 40th St., Phoenix, Ariz. 85018

[21] Appl. No.: 512,268

[22] Filed: Apr. 20, 1990

[51] Int. Cl.⁵ .............................................. H04M 1/64
[52] U.S. Cl. ........................................ 379/67; 379/88; 379/96; 379/97
[58] Field of Search ........................ 379/88, 89, 67, 97, 379/96, 396

[56] References Cited

U.S. PATENT DOCUMENTS 4,755,932  7/1988  Diedrich ............................. 364/200
4,783,800 11/1988  Levine ................................. 379/67
4,969,136 11/1990  Chamberlin et al. ................ 369/29

OTHER PUBLICATIONS

"Now Let Your Computer Reach Out", A. Seebig, *Computers & Electronics*, Apr. 1984, pp. 56-59, 109-112.

Primary Examiner—Thomas W. Brown
Attorney, Agent, or Firm—Robert L. Harrington

[57] ABSTRACT

A series of storage units simulating the capability of answering machines connected to a computer operated dispatch unit connected into a telephone system. The storage units are coded to represent calendar days. A user calls the dispatch unit and identifies the code of a selected day, to thereby inter-connect with the designated storage unit. Further touch tone signals actuate storage retrieval and record input functions of the storage unit. Scheduled events are thereby both retrieved from and recorded into the storage units. Multiple users are provided with remote control access to the storage unit. A master phone with a visual display is capable of retrieving the calendar day scheduled events visually with additional means for printing hard copies thereof.

5 Claims, 1 Drawing Sheet

PHONE ACTUATED CALENDAR

FIELD OF THE INVENTION

This invention relates to a remote controllable recordingretrieval system that enables a user to voice record scheduled events and to selectively retrieve the collection of voice recordings by calendar date.

BACKGROUND OF THE INVENTION

A problem that plagues people in all walks of life is keeping track of scheduled events. It is axiomatic that to avoid conflicts and missed events, there must be a master calendar on which all scheduled events are recorded and the master calendar must be diligently monitored. As new events are scheduled, the master calendar needs to be checked for conflicts and the new events entered.

As simple as the concept sounds, numerous problems are encountered primarily due to the limited accessibility of the calendar. A busy executive will need to schedule an event while away from the office that conflicts with an event previously scheduled and noted only on the office calendar. A spouse will schedule a social event that conflicts with an evening business meeting. And on and on.

A number of products are presently available as purported solutions to these problems. Calendars organized for easy record keeping have been developed as an aid to the user for keeping track of dates. Pocket calendars enable the user to record events scheduled out of the office for easy entry into the master calendar upon return to the office. However, these and all the other proposed aids simply attempt to alleviate the problem of inaccessibility and do not directly provide improved accessibility of the calendar.

SUMMARY OF THE INVENTION

No one has heretofore recognized that the many advances in communication technology can be organized into an audio calendar that can be accessed remotely with no more equipment availability than a telephone.

Telephones are available almost anywhere. A user can be flying across the country and phone the office or home from the airplane. Car phones have become common place and the technology is already available for users to carry personal cordless phones to enable immediate phone contact with one's office or home on a 24-hour basis. At present, a vast majority of users are within scant seconds of a phone a vast majority of the time.

Voice recorders and playback units used in conjunction with telephone systems are also highly developed and widely used, i.e. telephone answering machines. Also, touch tone phone signals are commonly used to automatically dispatch calls as among a number of alternative message recordings.

Insofar as known, no one has heretofore recognized the advantage of assembling these well known technologies into a remote control calendar. In the preferred embodiment of the present invention, what in effect simulates a common answering machine is provided for every day of the calendar week, month or year as desired. Each answering machine is designated by a code that indicates a specific date of the calendar period and can be directly accessed for recording and retrieving messages, or it can be accessed remotely with a touch tone phone.

Phone systems are also capable of visual display and are inter-connected with computers that both record messages input from a telephone unit and transmit the recorded messages visually to a display screen provided on the phone unit. It is contemplated that such visual recording and retrieval capability may be incorporated into the phone activated calendar of the invention.

As an example of the preferred embodiment of the invention, a code of sorts is used to identify specific dates, e.g. the number 101 indicates January 1, 210 indicates February 10, and 530 indicates May 30, etc. In operation, consider that on Monday, January 7, a user in a meeting away from the office wishes to schedule an event for the evening of January 17. He calls his master calendar phone number. When answered, he presses 117* (the star sign being the playback signal) to receive the recorded events for that date and thereby determine whether there is a conflict. When the recording for that date ends, he presses the # button (the pound sign being the record signal) and records onto that day's events the newly scheduled event. Subsequently, the user's spouse wants to schedule a social event for that same evening. The spouse follows the same routine and the conflict is immediately evident. The spouse may then reschedule the social event and this time upon finding the user's calendar free of conflict will enter the social event into the user's master office calendar. The user will be made aware of the spouse's scheduled event when subsequently accessing that calendar date.

The invention will be more fully appreciated with reference to the following detail description and drawings referred to therein.

DETAILED DESCRIPTION

Figure 1:
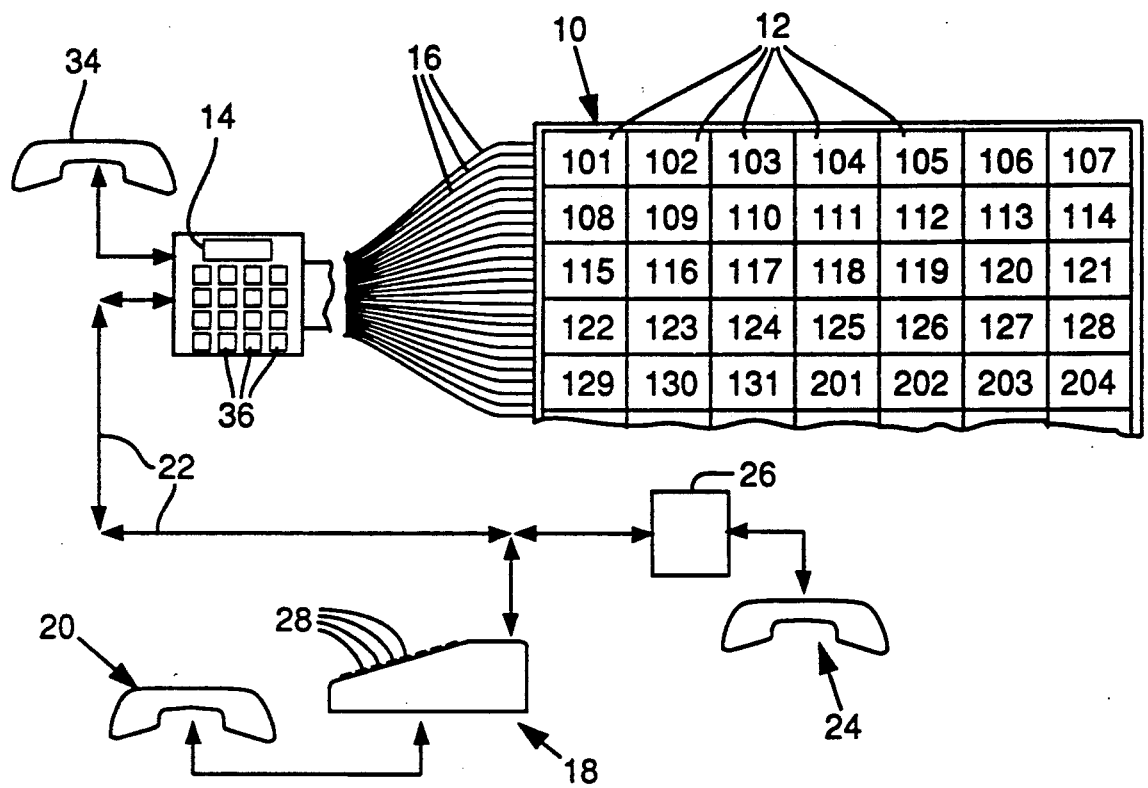
FIG. 1 is a schematic view illustrating a phone actuated master calendar in accordance with the present invention.

With reference to the figures, assembly 10 represents a 35 day master calendar. The illustration is intended to provide sufficient storage to schedule the events for at least a full month. Many variations are, of course, possible. Enough individual storage units 12 can be provided to accommodate a full year (365 units) or even multiple years. Of course, fewer units can be provided as well, e.g. for a week of scheduled events.

As illustrated, master calendar 10 is set up for the scheduling of events during January and the first four days of February. The system contemplates ready changing of the access code and on January 2, the user can change the code of unit 101 to 205 (the fifth day of February) and so on.

The inventor is not aware of the most current technology available in the communications art. It is believed that communications experts, upon being made aware of the invention, will be able to dramatically simplify the system as described hereafter. The following description is based on what the inventor knows to be commercially available equipment.

Units 12 designated in FIG. 1 by access code numbers 101-204 are individual answering machines each connected to an extension of a telephone system. A dispatch unit 14 (e.g. consisting of a computer that is appropriately programmed) is connected through lines 16 to the individual units 12. Completing the system is a telephone communication system including a communication linkage (arrow 22) to a user master phone unit 18, including head set 20, and any outside phone unit 24 connected through a telephone exchange system 26.

Figure 2:
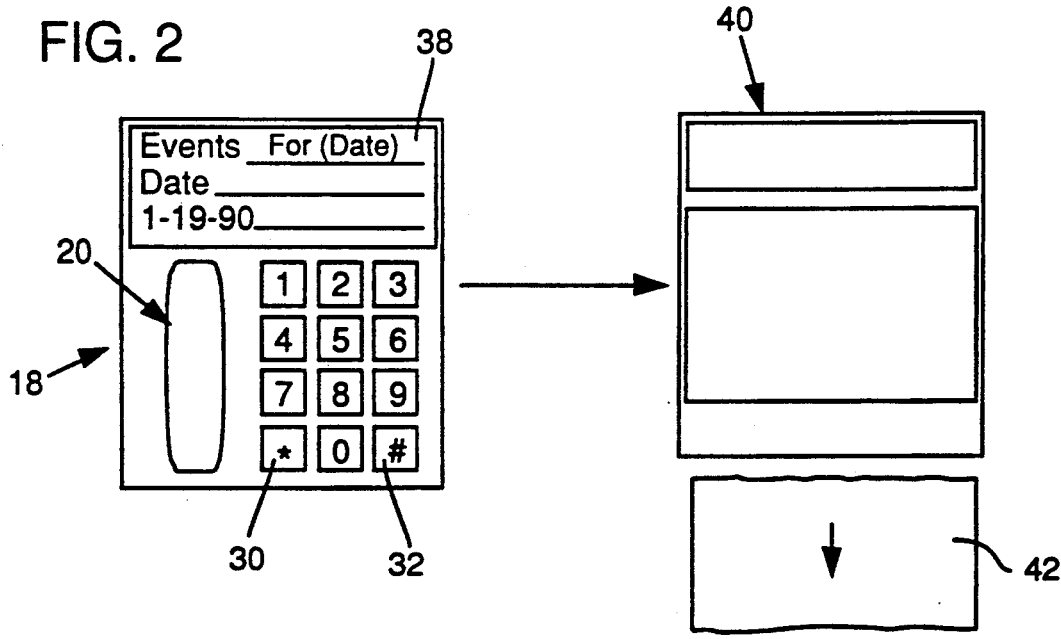
FIG. 2 illustrates a phone unit for use with the master calendar of FIG. 1.

The master phone unit can include a number of options, several of which are discussed in connection with the illustration of FIG. 2. The basic operation without consideration of the options will be discussed at this point.

It will be assumed that the user has an office that is remote from a reception area. The master phone 18 is located in the office and the dispatch unit 14 is located at the reception area. It is further contemplated that the dispatch unit 14 and storage 15 units 12 could be housed together in a housing that is small enough to sit on a receptionist's desk. Nevertheless, for the purpose of maintaining consistency with that which is known to exist, the appropriate number of units 12 may reside in a small equipment room. Unit 12 would be connected through a cable including lines 16 to dispatch unit 14 located at the reception area.

In a typical day-to-day operation, as the user schedules events through the calendar period (January 1-February 4 in the illustration), the user simply punches in the appropriate code using touch tone buttons 28. The dispatch unit 14 automatically connects the appropriate storage unit 12 to the master phone unit 18. The user then presses the play back button, e.g. the star button 30 in FIG. 2, to determine the already scheduled events for that day. The storage unit then plays back any previous recordings. It will then pause to allow the user to press the record button, e.g. the pound button 32 in FIG. 2, and simply voice record the to be scheduled events.

The receptionist has a phone 34 that enables similar direct accessing of the selected storage unit 12. The keyboard buttons 36 provide the same or expanded abilities to retrieve or enter data from the storage unit.

The exchange system 26 and phone 24 indicate the ability of the system to be manipulated away from the office. The user 10 can be anywhere where there is telephone accessibility. Thus, whenever or wherever the user encounters a need to check already scheduled events or to schedule a new event, all that is needed is to place a phone call. The dispatch unit will answer the outside call and because the codes are known to the caller, the storage unit can be accessed in the same manner described above. Note that the caller can just as well be a spouse calling from home. Thus, the master calendar becomes a multi-user remote control calendar that serves a variety of situations not heretofore possible.

The calendar also accommodates visual display of the calendar events. Again the experts in communications technology will undoubtedly be able to simplify the concept. However, it is certainly feasible for the receptionist to utilize an expanded keyboard wherein keys 36 enable the receptionist to generate a printed daily agenda. For example, when any user signals the system to record an event for any day of the calendar period, a simultaneous recording is made at the receptionist's station 14. At each day end (or day beginning) the receptionist can visually call up the prior visual record of a particular day's events and simply add the new events to thereby convert the voice recording over to a printed recording. In this way, there would always exist both visual and voice recordings of the calendar. The user's unit 18 can include a CRT display 38 providing the user with the option to call up the visual display rather than the voice recording. Of course, the visual display can be programmed to display one or several days' events. Furthermore, as also enabled with existing technology, either the unit 18 or the unit 14 can be connected to a printer 40 and as desired a hard copy 42 can be printed out covering whatever calendar period is desired.

As previously explained, the invention herein is considered to be a combination of functional components that already exist individually but in so far as known have never been combined to achieve a phone activated calendar. Others will undoubtedly be able to improve upon the system and the improvements are considered to be encompassed by this invention as determined by the definitions of the claims appended hereto.

I claim:

1. A system for generating a master calendar comprising;
    a pre-determined number of storage units, each storage unit associated with a calendar day of a designated calendar period,
    a dispatch unit connected into a telephone system for receiving conventional telephonic signals and providing telephone access to a particular one of said storage units in response to said telephonic signals designating a calendar day associated with said particular one of said storage units,
    said storage units each including audio transmitting and audio recording capabilities responsive to the telephonic signals for transmitting audio information into said telephone system and recording audio information taken from said telephone system by way of said telephone access provided by said dispatch unit.

2. A system as defined in claim 1 wherein the dispatch unit associates individual storage units with the calendar days of the designated calendar period by DTMF codes of said telephone signals, said dispatch unit being programmable for changing the DTMF code associations to update the calendar period.

3. A system as defined in claim 2 including a master phone unit as a component of the telephone system, said master phone unit having a visual display, said dispatch unit including means for creating a visual recording of the data stored in the storage unit, said master phone unit and telephone system connected to access the visual recording for selectively retrieving sound and visual recordings of a selected calendar day.

4. A system as defined in claim 3 wherein a hard copy printer is connected to the master phone unit for printing the visual recording of a selected calendar day.

5. A telephone actuated calendar comprising:
    a plurality of storage units each associated with a calendar day of a calendar period, each storage unit adapted for recording voice information and transmitting recorded voice information by way of telephone access thereto in response to telephonic signals; and
    a dispatch unit adapted for coupling to a telephone system for receiving an incoming telephone call of the telephone system and providing telephone access by said incoming telephone call to a selected one of said storage units in response to telephonic signals of said incoming telephone call designating a calendar day associated with said selected one of said storage units.

* * * * *